United States Patent [19]

Egami

[11] Patent Number: 5,010,332
[45] Date of Patent: Apr. 23, 1991

[54] DATA TRANSMISSION APPARATUS

[75] Inventor: Noritaka Egami, Nagasaki, Japan

[73] Assignee: Mitsubishi Denki Kabushiki Kaisha, Tokyo, Japan

[21] Appl. No.: 528,287

[22] Filed: May 25, 1990

Related U.S. Application Data

[63] Continuation-in-part of Ser. No. 228,509, Aug. 5, 1988, abandoned.

[30] Foreign Application Priority Data

Aug. 6, 1987 [JP] Japan ................... 62-195181

[51] Int. Cl.⁵ .................................. H04Q 1/00
[52] U.S. Cl. ................... 340/825.5; 340/825.51; 370/85.6; 370/85.15
[58] Field of Search ............ 340/825.01, 827, 825.05, 340/825.5, 825.51, 825.02; 371/8, 11; 370/15, 16, 85.6, 85.15

[56] References Cited

U.S. PATENT DOCUMENTS

| | | | |
|---|---|---|---|
| 4,430,651 | 2/1984 | Bryant et al. | 370/94 X |
| 4,531,238 | 7/1985 | Rawson et al. | 340/825.5 X |
| 4,554,659 | 11/1985 | Blood et al. | 370/86 X |
| 4,554,673 | 11/1985 | Steven | 370/86 X |
| 4,752,924 | 6/1988 | Darnell et al. | 340/825.05 X |

FOREIGN PATENT DOCUMENTS 21204784 11/1984 Japan .

Primary Examiner—Ulysses Weldon
Attorney, Agent, or Firm—Rothwell, Figg, Ernst & Kurz

[57] ABSTRACT

A data transmission apparatus has a data transceiver which transmits data for one among a number of stations, to all of a number of output terminals, and which receives at one of its input terminals data sent by any one of the other stations, fetches the data into its own apparatus, and at the same time, transfers the receiving data to output terminals for all stations except the station which has sent the data, thereby enabling communication via a plurality of different paths and not making communication impossible even if disconnection is present in a transmission path.

5 Claims, 6 Drawing Sheets

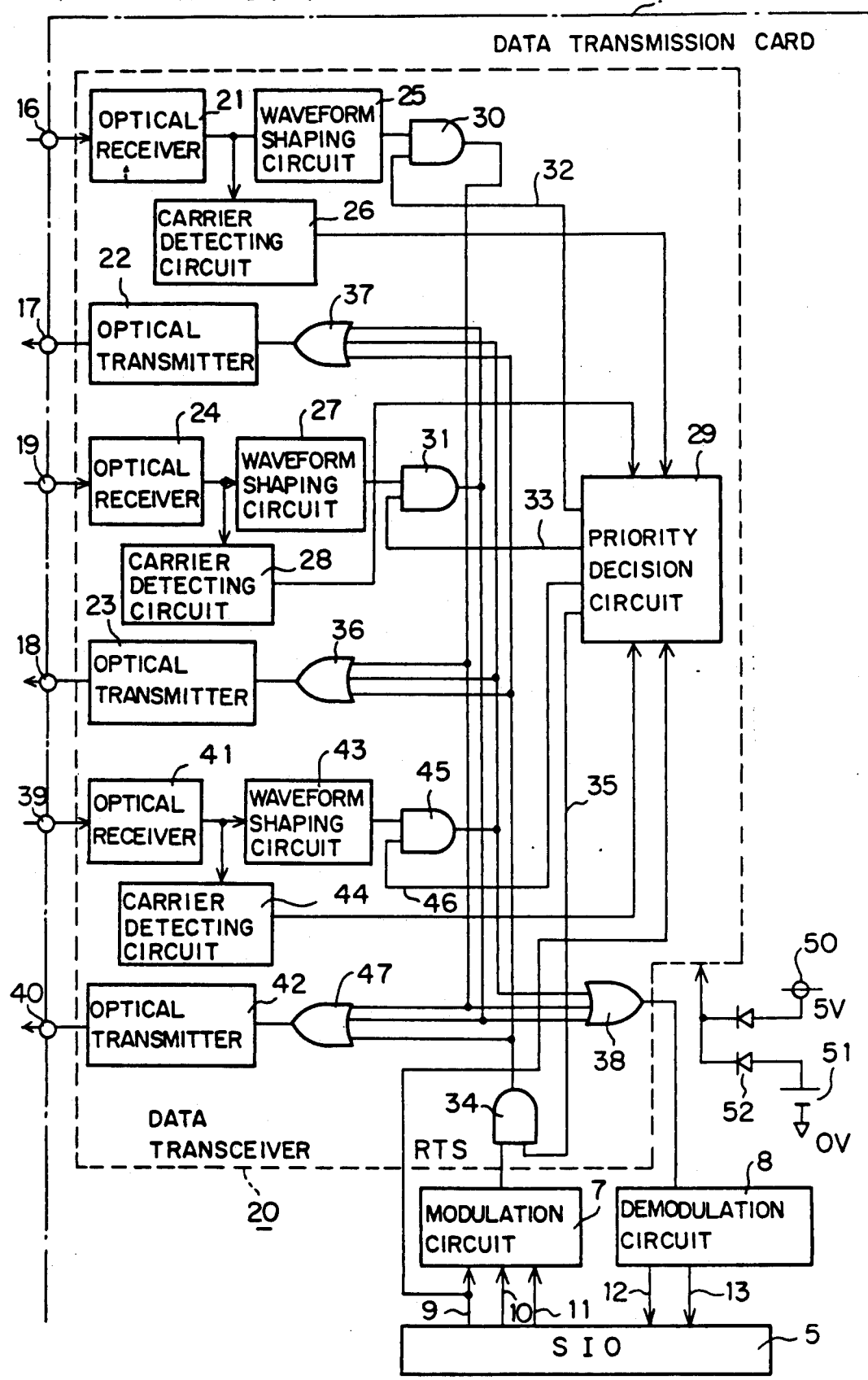

DATA TRANSMISSION APPARATUS

This is a continuation-in-part of No. 07/288,509, filed Aug. 5, 1988, now abandoned.

BACKGROUND OF THE INVENTION

1. Field of the Invention

This invention relates to a data transmission apparatus which transmits and receives data between respective stations forming a communication system, and particularly to a data transmission apparatus which enables communications using different paths even if disconnection happens between a pair of stations.

2. Description of the Prior Art

FIG. 1 is a block diagram showing a conventional data transmission apparatus which is shown in Japanese Patent Laid-open No. 212047/1984. In FIG. 1, symbols a, e, and f denote a data transmission card as the data transmission apparatus, a system bus in a station, and a communication cable for connecting stations with one another, respectively. A numeral 1 is a microprocessor for transmission control of the data transmission card a, a numeral 2 is an internal bus of the microprocessor, a numeral 3 is a memory connected to the internal bus 2, a numeral 4 is an interface circuit (hereafter called I/F) which is connected to the internal bus and interfaces with the system bus e, a numeral 5 is an input/output circuit (hereafter called SIO) which is connected to the internal bus 2 and performs cross translation between a serial signal and a parallel signal, a numeral 6 is a direct memory access controller (hereafter called DMA) which is connected to the internal bus 2 and allows data to be directly exchanged between the microprocessor 1 and the SIO 5, a numeral 7 is a modulation circuit connected to the SIO 5, a numeral 8 is a demodulation circuit connected to the SIO 5, a numeral 9 is a solicit request signal sent to the modulation circuit 7 from the SIO 5, a numeral 10 is a transmitting clock sent to the modulation circuit 7 from the SIO 5 in the same way, a numeral 11 is serial transmitting data sent to the modulation circuit 7 from the SIO 5 in the same way, a numeral 12 is a receiving clock sent to the SIO 5 from the demodulation circuit 8, numeral 13 is a serial receiving data sent to the SIO 5 from the demodulation circuit 8, a numeral 14 is a driver for sending an output of the modulation circuit 7 to the communication cable f, and numeral 15 is a receiver for supplying an input from the communication cable f to the demodulation circuit 8.

FIG. 2 is a block diagram showing one example of stations constructed using such a data transmission card a. In FIG. 2, symbols b, c, and d are a CPU card, a memory card, and an IO card, respectively. These cards are connected to the system bus e together with the data transmission card a. Furthermore, FIG. 3 is a block diagram showing a communication system constructed by such a station. In FIG. 3, A, B, C, and D are stations described previously and are connected to each other by the communication cable f using a multi-drop system.

Next, the operation will be described. When data are transmitted from one station, for example, the station A, a solicit request for data transmission from the CPU card b is sent to the transmission card a by the system bus e, interfaced with the system bus e in the I/F, and transferred to the microprocessor 1 via the internal bus 2. The microprocessor 1 which has received this solicit request is set up for sending and sends a transmission starting signal to the SIO 5. The SIO 5 fetches transmitting data from the memory 3 using the DMA 6, converts them from parallel signals to serial signals, makes the solicit request signal 9 continuously active, and sends the transmitting clock 10 and the transmitting data 11 to the modulation circuit 7. In the modulation circuit 7, the received transmitting clock 10 and transmitting data 11 are modulated, converted into some modulated signals, and sent to the communication cable f via the driver 14.

The other stations B, C, and D receive the above-mentioned modulated signals from the communication cable f by the receiver 15 and send the received signals to the demodulation circuit 8. In the demodulation circuit 8, they are demodulated and separated into the receiving clock 12 and the receiving data 13, which are sent to the SIO 5. The SIO 5 converts them from serial signals to parallel signals. The received data are written in the memory 3 using the DMA 6 and, at the same time, this result is reported to the microprocessor 1 at the time point of termination of reception. The microprocessor 1 reports the result to the CPU card b from the I/F 4 via the system bus e.

In practical data transmission, these steps are executed through more complicated procedures including the use of addresses and the numbers of transmitting sources. But, since they are not directly related to this invention, they are omitted.

Since a conventional data transmission apparatus is constructed as described above, in the communication system adopting a multi-drop form, for example, when troubles in the communication cable f occur between the stations B ahd C, there is a problem that data transmission between the stations A and C, the stations A and D, the stations B and C, and the stations B and D are disabled. When the connection of a loop form is done by a communication cable shown by virtual line in FIG. 3, the influence due to reflections in the communication cable are increased at a transmission speed over 1 Mbps or so, thereby making it difficult to construct a practicable communication system.

SUMMARY OF THE INVENTION

This invention has been devised to solve such problems. The object of this invention is to obtain a data transmission apparatus capable of providing, a perfect communication system for allowing communications by use of different paths even if disconnections are present between stations.

The data transmission apparatus related to this invention is provided with a plurality of input terminals for receiving data from the other stations, a plurality of output terminals for transmitting data to the other stations, and a transceiver unit which outputs transmitting data to all of the plurality of output terminals, fetches receiving data into from the plurality of input terminals; and at the same time, sends the receiving data to output terminals for stations other than those which have transmitted the receiving data.

Other objects of this invention will be clarified by the detailed description on the following embodiment in reference to the appended drawings.

BRIEF DESCRIPTION OF THE DRAWINGS

FIG. 7 is a block diagram showing an important part of another embodiment according to this invention;

DETAILED DESCRIPTION OF THE PREFERRED EMBODIMENTS

Figure 1:
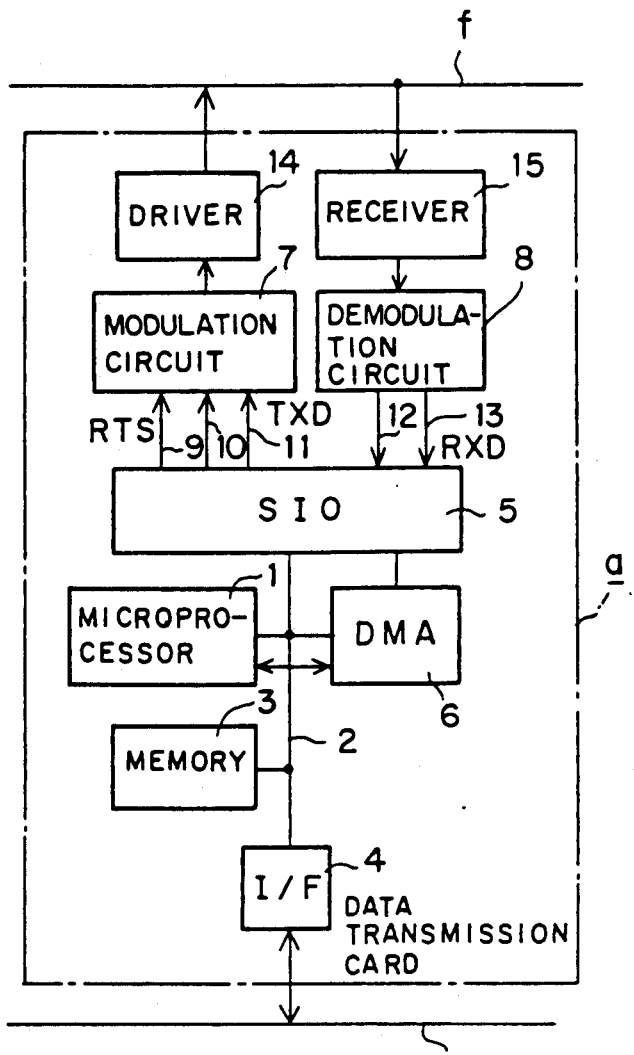
FIG. 1 is a block diagram showing a conventional data transmission apparatus.
Figure 3:
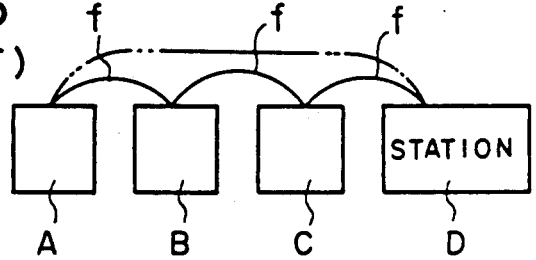
FIG. 3 is a constitutional drawing showing an example of a communication system constructed by a plurality of stations as shown in FIG. 2.
Figure 2:
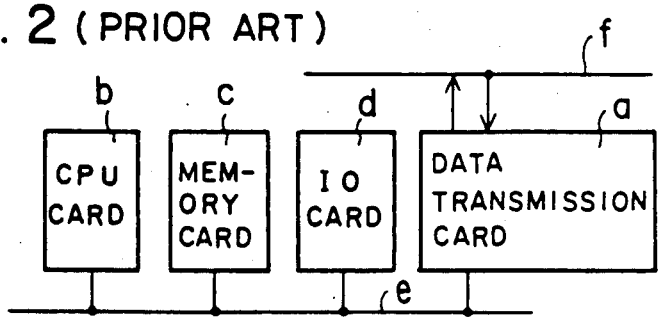
FIG. 2 is a constitutional drawing of a station using the above-mentioned data transmission apparatus.
Figure 4:
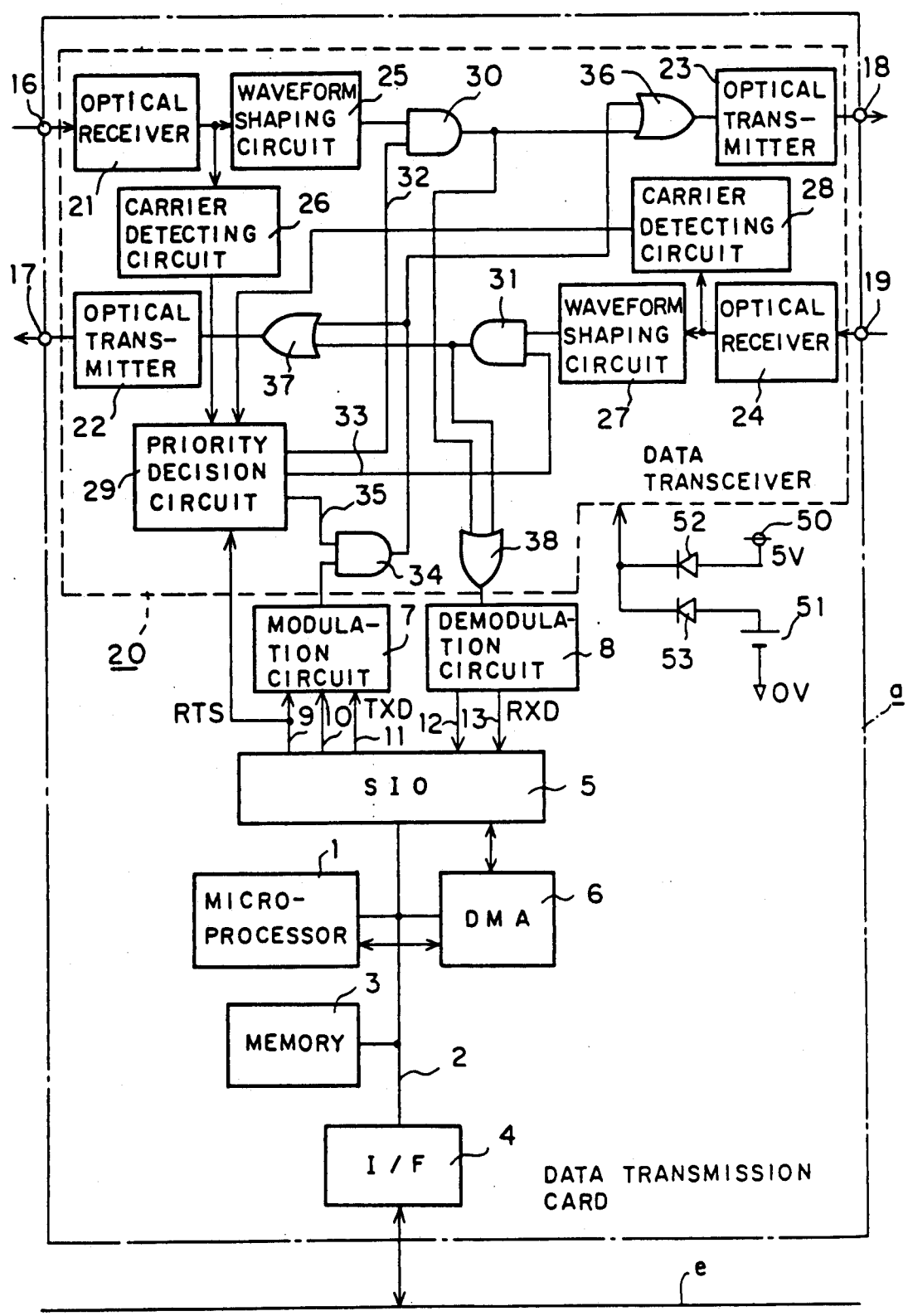
FIG. 4 is a block diagram showing a data transmission apparatus based on an embodiment according to this invention.

Hereinafter, an embodiment according to this invention will be described in reference to drawings. In FIG. 4, symbols a and e are a data transmission card and a system bus, respectively. A numeral 1 is a microprocessor, a numeral 2 is an internal bus, a numeral 3 is a memory, a numeral 4 is the I/F, a numeral 5 is a SIO, a numeral 6 is a DMA, a numeral 7 is a modulation circuit, a numeral 8 is a demodulation circuit, a numeral 9 is a solicit request signal, a numeral 10 is a transmitting clock, a numeral 11 is transmitting data, a numeral 12 is a receiving clock, and a numeral 13 is receiving data. As the parts marked by the same symbols as those in FIG. 1 are the same as or equivalent to those of FIG. 1, the detailed description is omitted. Numerals 16 and 19 are two input terminals for receiving data sent from other stations, respectively, and numerals 17 and 18 are output terminals for transmitting respective data to the other stations. A numeral 20 is a transceiver unit which outputs transmitting data to the two output terminals 17 and 18, sends receiving data input from one of the input terminals 16 and 19, to the output terminals except the output terminal connected to the station which has transmitted the receiving data, and at the same time, transmits the receiving data into its own station. The transceiver unit 20 comprises the following circuits. Numerals 21 and 24 are optical receivers connected to the input terminals 16 and 19 respectively. Numerals 22 and 23 are optical transmitters connected to the output terminals 17 and 18 respectively. Numerals 25 and 27 are waveform shaping circuits connected to the optical receivers 21 and 24 respectively. Numerals 26 and 28 are carrier detecting circuits connected to the optical receivers 21 and 24 respectively. Numeral 29 is a priority decision circuit for deciding priority based on the outputs of the carrier detecting circuits 26 and 28 and the solicit request signal 9 from SIO 5. Numerals 30 and 31 are AND gates which open and shut the output of the waveform shaping circuits 25 and 27 respectively using the output signal 32 or 33 of the priority decision circuit 29. A numeral 34 is an AND gate which opens and shuts the output of the modulation circuit 7 using the output signal 35 of the priority decision circuit 29. Numerals 36 and 37 are OR gates in which the output of the AND gates 30 and 31 respectively and the output of the AND gate 34 are ORed to supply the logical sum to the optical transmitter 23 or 22. A numeral 38 is an OR gate in which the output of the AND gate 30 and that of the AND gate 31 are ORed to supply the logical sum to the demodulation circuit 8. Furthermore, a numeral 50 is an ordinary power source of the data transceiver unit 20, and a numeral 51 is a battery as a backup power source which, when the voltage of the power source 50 drops, guarantees the voltage drop. Numerals 52 and 53 are diodes for connecting the power source 50 and the battery 51 to a feeder not shown in the drawing of the data transceiver unit 20.

Figure 9:
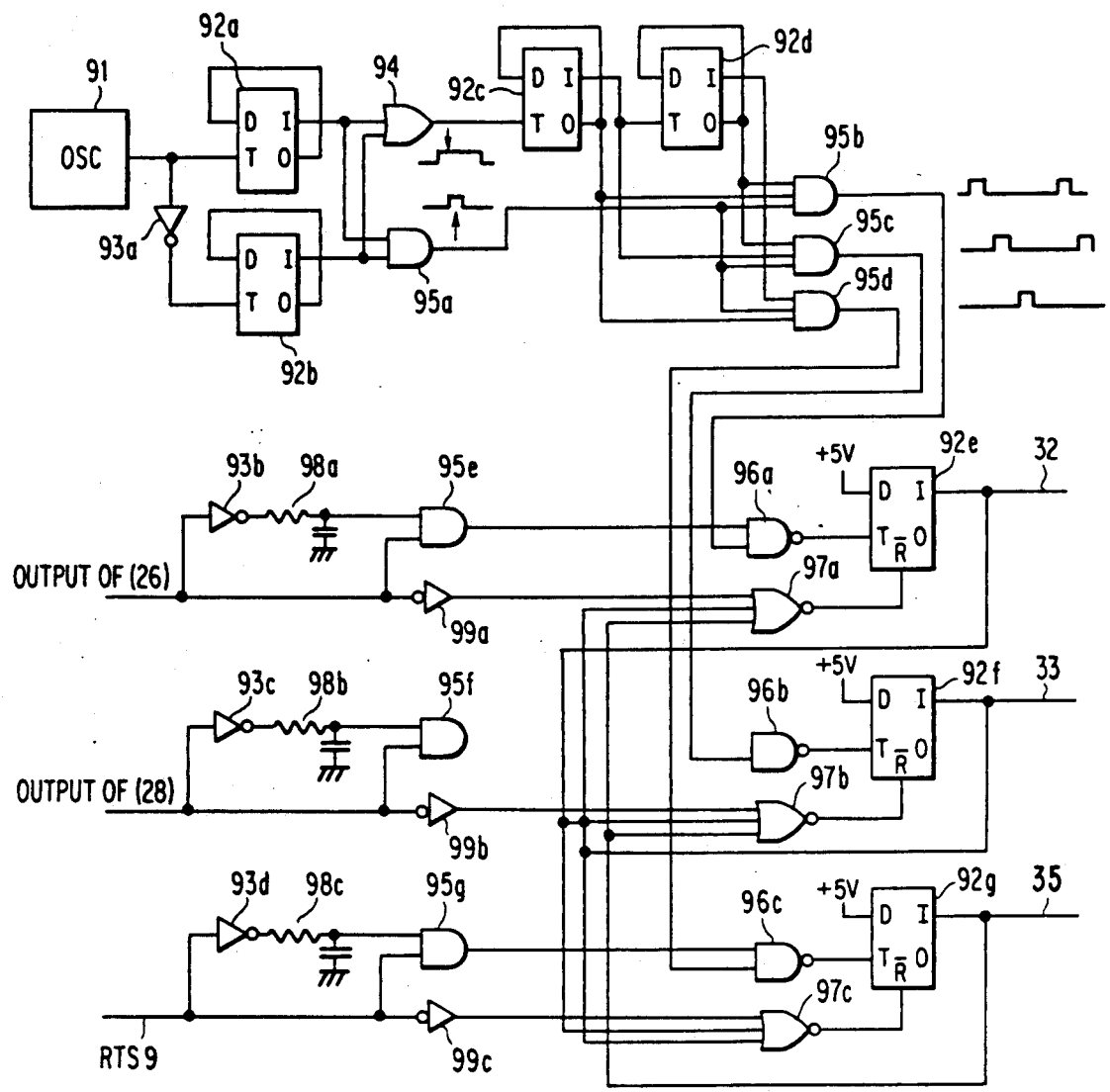
FIG. 9 is a schematic diagram of one example of a priority decision circuit 29 of FIGS. 4 and 7.

FIG. 9 illustrates, by way of example, the details of one possible construction of the priority decision circuit 29. A timing circuit includes clock oscillator 91, flip-flop logic circuits 92a-92d, inverter 93a, OR gate 94, and AND gates 95a-95d. AND gates 95b-95d provide slightly offset clock pulses to NAND gates 96a-96c, whose outputs are connected to inputs of flip-flops 92e-92g. The outputs of flip-flops 92e-92g correspond to the outputs 32, 33 and 35 respectively. Additionally, each output is also coupled to the rest terminal of the other two flip-flops via three-input NOR gates 97a-97c. The output signals of carrier detecting circuits 26, 28 and RTS signal 9 are coupled to NAND and NOR gates 96a-97a, 96b-97b, and 96c-97c respectively, through respective inverters 93b-93d, 99a-99c, RC circuits 98a-98c, and NAND gates 95e-95g. As long as signals 26, 28 and 9 are at "L" logic states, outputs of inverters 93b-93d are at "H" logic states, charging up the capacitors of RC circuits 98a-98c, and providing "H" signals to NOR gates 97a-97c which present flip-flops 92e-92g from outputting "H" signals. When any one of signals 26, 28 or 9 goes high, as "H" signal will be produced at the output of the corresponding AND gate 95e-95g, for a time period equal to RC, before the capacitor discharges. Simultaneously, the reset terminal of the corresponding flip-flop 92e-92g will be disabled by a signal from inverter 99a-99c and NOR gate 97a-97c. When a pulse is fed to the corresponding NAND gate 96a-96c by AND gates 95b-95d, the corresponding flip-flop 92e-92g will produce a high output, simultaneously providing a reset signal to the other two flip-flops, thus preventing a high signal from being generated by the subsequent presence of a high signal from one of the other inputs 26, 28 or 9. The length of time for any one continuous transmission is limited to a time equal to the value of RC.

Figure 10:
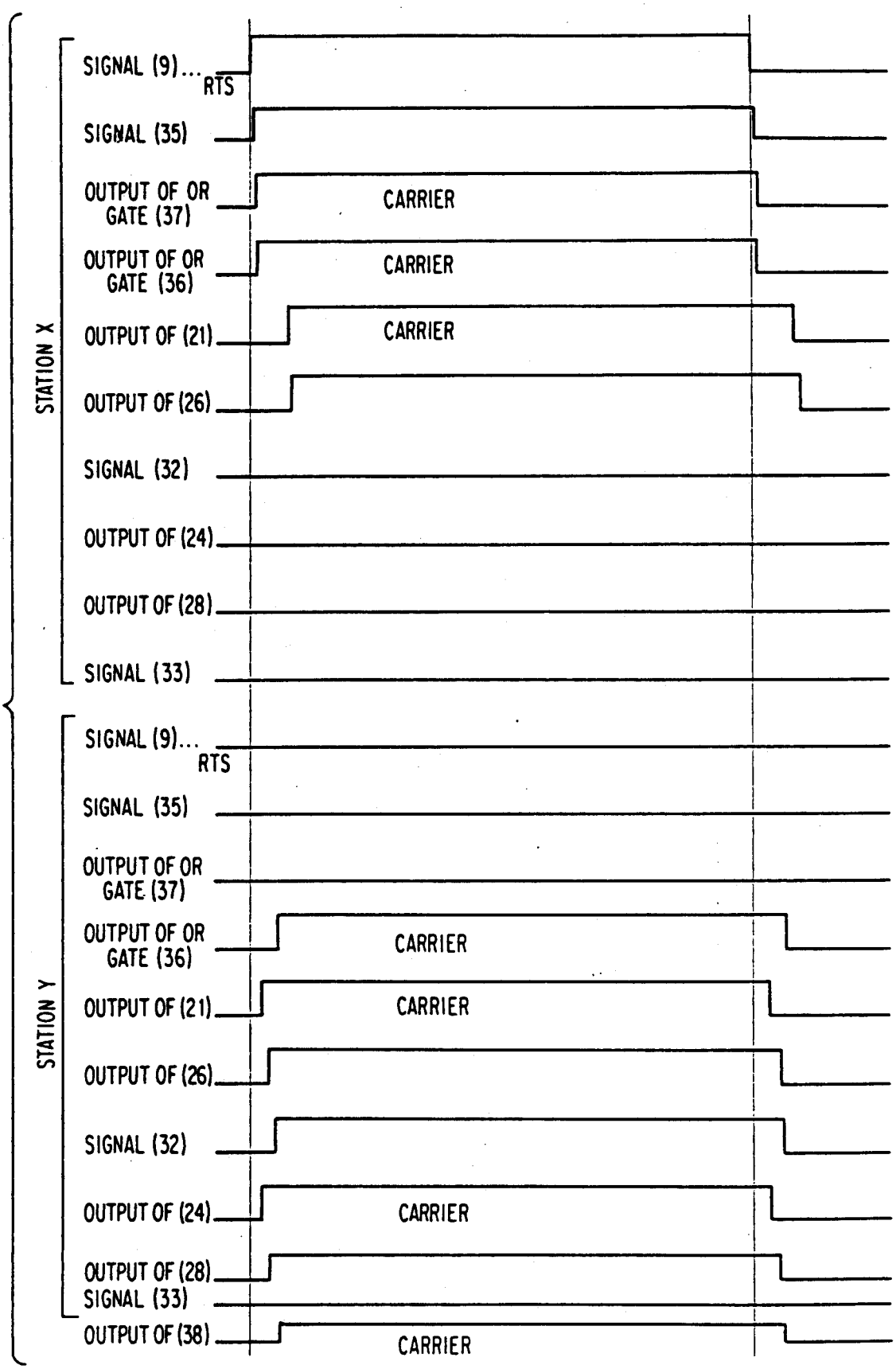
FIG. 10 is a timing chart for explaining the operation of the priority decision circuit of FIG. 9.

An explanation of the operation of the priority decision circuit 29 will now be described with respect to the transmission of data from any one station "X" to another station "Y", referring to the timing chart of FIG. 10 in conjunction with FIG. 4. The RTS signal 9 of station X becomes high, indicating that data is ready to be transmitted. In the absence of signals from circuits 26 and 28, priority decision circuit 29 will change the output signal 35 to "H". Data is then transmitted through gates 36, 37 to optical transmitters 23, 22. At the station Y, optical receivers 21, 24 receive the data signal, and detectors 26, 28 output "H" signals. Since detector signal 26 goes high first, priority decision circuit 29 changes output signal 32 to "H", and the signal from receiver 21 is shaped by circuit 25, demodulated in demodulator circuit 8, and transmitted by transmitter 23 through gate 36. At station X, receiver 26 detects the signal from station Y, however the priority decision circuit keeps signal 32 at "L" in station X. When data transmission has been completed in station X, RTS 9 goes low, priority decision circuit 29 changes signal 35 to "L", the carrier signal to the receivers 21, 24 of station Y is stopped, outputs of 26, 28 go "L", and priority decision circuit 29 changes signal 32 to "L".

Figure 5:
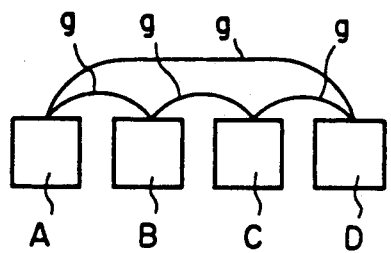
FIG. 5 is a constitutional drawing showing an example of a communication system constructed by the stations using the data transmission apparatus shown in FIG. 4.

FIG. 5 is a constitutional drawing showing an example of a communication system constructed by stations configured using such a data transmission card a of FIG. 4. In FIG. 5, symbols A, B, C, and D are stations respectively, and they are connected with one another by an optical fiber cable g in the form of a loop.

Figure 6:
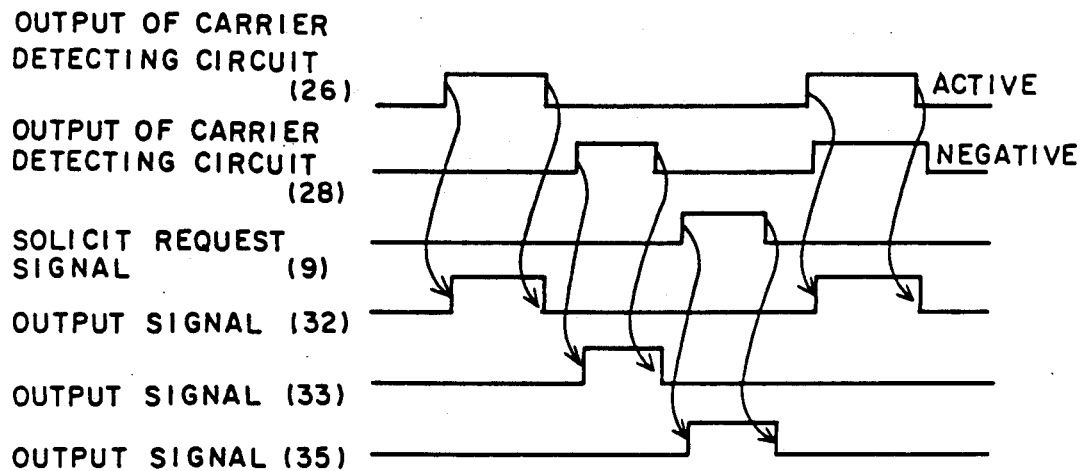
FIG. 6 is a time chart showing the operation of the priority decision circuit 29 of FIG. 4.

Next, the operation will be described. Here, FIG. 6 is a time chart showing the operation of the priority decision circuit 29. When data are transmitted from one station, for example, the station A, the operations of the microprocessor 1, the SIO 5, the DMA, and the like which have received the solicit request are the same as those in the conventional case. When the solicit request signal 9 becomes active, the priority decision circuit 29 detects the active signal, converting the output signal 35 from a "L"-logic to a "H"-logic state. Each of the output signals 32, 33, and 35 of the priority decision circuit 29 are usually kept at "L"-logics states as shown in FIG. 6, and only the output signal 35 becomes a "H"-logic state while the solicit request signal 9 is active. Accordingly, the AND gate 34 is opened. The transmitting signal modulated big the modulation circuit 7 is passed through the AND gate 34 and transferred to the optical transmitters 23 and 22 via OR gates 36 and 37, at which they are converted into optical signals, being sent to the station B or D via the output terminals 18 and 17.

After the data output from the output terminal 18 of the station A are input to the input terminal 16 of the station B and converted into electrical signals by the optical receiver 21, they are waveform-shaped by the waveform shaping circuit 25 and supplied to the AND gate 30. Here, the carrier detecting circuit 26 is monitoring the output of the optical receiver 21, and when it detects a carrier, it makes its output active. When the output of the carrier detecting circuit 26 is made active, the priority decision circuit 29 converts the output signal 32 from a "L"-logic to a "H"-logic static as shown in FIG. 6, thereby opening the AND gate 30. Accordingly, the output of the waveform shaping circuit 25 is supplied to the OR gates 36 and 38 via the AND gate 30. The output of the OR gate 36 is converted into an optical signal in the optical transmitter 23 and sent to the station C from the output terminal 18. On the other hand, the output of the OR gate 38 is sent to the demodulation circuit 8, demodulated therein, transferred to the SIO 5, and thereafter processed in the same way as in the conventional case.

Similarly in the station D, data output from the output terminal 17 of the station A is input to the input terminal 19 of the station D. As shown in FIG. 6, when the carrier detecting circuit 28 detects a carrier, the output signal 33 of the priority decision circuit 29 becomes a "H"-logic state. The signal waveform-shaped in the waveform shaping circuit 27 is supplied to the OR gates 37 and 38 through the AND gate 31 which is opened by the output signal 33 of the "H"-logic. The output of the OR gate 37 is converted to an optical signal in the optical transmitter 22 and sent to the station C from the output terminal 17. On the other hand, the output of the of gate 38 is sent to the demodulation circuit 8 and demodulated therein.

In the station C in which its input terminals 16 and 19 are supplied with data from the stations B and D respectively, as shown in FIG. 5, though the both outputs of the carrier detecting circuits 26 and 28 become active, the priority decision circuit 29 detects the slight time difference therebetween with the result that the output signal 32 of the carrier detecting circuit 26 of which output has become active earlier is made to be a "H"-logic to open the AND gate 30. Thereafter, the signal is processed in the same way as in the above-mentioned case.

Here, when the power source 50 has dropped, the transfers of data from the input terminals 16 and 19 to the output terminals 18 and 17 are stopped, respectively. Accordingly, the power source is backed up by the battery 51. Even in the case where the power source 50 has dropped, at least the power source for the data transceiver unit 20 is guaranteed so as not to stop the function of the data transceiver unit 20.

Figure 8:
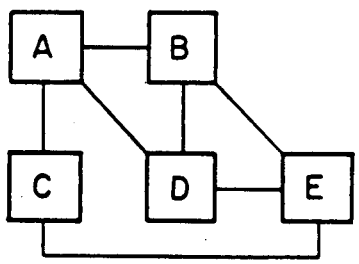
FIG. 8 is a constitutional drawing showing an example of a communication system constructed by the stations using the embodiment shown in FIG. 7.

Moreover, though input terminals and output terminals are both provided two by two in the above-mentioned embodiment, they may be both provided three by three or more. FIG. 7 is a block diagram showing an important part of the embodiment in which input terminals and output terminals are both provided three by three. In FIG. 7, numerals 39 and 40 are an input terminal and an output terminal, respectively. Numerals 41 and 42 are an optical receiver and an optical transmitter, respectively. A numeral 43 is a waveform shaping circuit, a numeral 44 is a carrier detecting circuit, a numeral 45 is an AND gate corresponding to the AND gates 30 and 31, a numeral 46 is an output signal of the priority decision circuit 29 corresponding to the output signals 32 and 33, and a numeral 47 is an OR gate corresponding to the OR gates 36 and 37. The other parts are equivalent to those identified by the same symbols and numerals of FIG. 4. In this embodiment, transmitting data are output from all of three output terminals 17, 18, and 40. For example, receiving data received from the input terminal 16 are sent from the output terminals 18 and 40 corresponding to the other stations except the output terminal 17 corresponding to the station which has transmitted the receiving data. FIG. 8 is a constitutional drawing showing an example of a communication system constructed by the stations A through E using such a data transmission card a. A pair of input/output terminals are vacant in the station C.

Incidentally, though optical fiber cables are used as communication cables in the above-mentioned embodiment, electrical cables such as coaxial cables and the like may be employed, thereby obtaining the same desired results as the above-mentioned embodiment.

As described above, since the data transmission apparatus according to this invention provides a plurality of input and output terminals each and the data transceiver unit 20 which outputs transmitting data to all of output terminals and fetches receiving data into its own apparatus, and at the same time, sends the receiving data to the output terminals for the stations except the station which has transmitted the receiving data, it is possible to obtain a perfect system for communication even if one place of the cable between two arbitrary stations is disconnected.

What is claimed is:

1. A data transmission apparatus for use in each of a plurality of stations of a communication system, comprising:
   a plurality of input terminals for receiving data from predetermined other stations of said system;
   a plurality of output terminals for transmitting data to said other stations; and a data transceiver unit, including
  means for transmitting data generated by the station in which said apparatus is being used to all of said output terminals simultaneously,
  means for receiving data from said input terminals including means for storing said received data internally, and simultaneously transmitting said received data to said output terminals except for an output terminal connected to the station from which said received data was transmitted, and
  priority decision means for detecting data received at said input terminals and enabling said means for receiving to store and simultaneously transmit only the earliest received data.

2. A data transmission apparatus according to claim 1 wherein optical fiber cables are used as communication cables for interconnecting respective stations.

3. A data transmission apparatus according to claim 1 wherein electrical cables such as coaxial cables are used as communication cables for interconnecting said stations.

4. A data transmission apparatus according to claim 1, wherein said means for receiving comprises:

a plurality of receivers each coupled to a respective input terminal;
  a demodulation circuit for demodulating a carrier signal containing said data; and
  logic means coupling each of said plurality of receivers to said demodulation circuit and responsive to said priority decision means to enable only the earliest carrier signal received by said plurality of receivers to be inputted to said demodulator circuit.

5. A data transmission apparatus according to claim 4, wherein said means for transmitting comprises:

a plurality of transmitters each coupled to a respective output terminal;
  a modulation circuit for modulating a carrier signal with data generated by said apparatus;
  said logic means further coupling each of said plurality of transmitters to a predetermined number of receivers and said modulation circuit and responsive to said property decision means to enable only said earliest received carrier signal to be coupled to a predetermined number of said transmitters, and to enable said modulated carrier signal to be coupled to each of said plurality of transmitters.

* * * * *

UNITED STATES PATENT AND TRADEMARK OFFICE
CERTIFICATE OF CORRECTION

PATENT NO. : 5,010,332

DATED : April 23, 1991

INVENTOR(S) : Noritaka Egami

It is certified that error appears in the above-identified patent and that said Letters Patent is hereby corrected as shown below:

Column 1, line 44, after "8" insert --a--.

Column 2, line 33, "ahd" should be --and--
        line 46, after "providing" delete the comma ",";
        line 56, after "data" delete "into".

Column 3, line 30, "the" should be --an--;
        line 59, "ahd" should be --and--.

Column 5, line 7, "such a" should be --the--;
        line 22, " "L"-logics" should be --"L"-logic--;
        line 26, "big" should be --by--;
        line 64, "of" (second occurrence) should be --OR--.

Column 6, line 58, after "communication" insert a comma --,--.

Column 7, line 6, after "terminals" insert a comma --,--.

Signed and Sealed this

Twelfth Day of January, 1993

Attest:

DOUGLAS B. COMER

*Attesting Officer*    Acting Commissioner of Patents and Trademarks